E. A. BOHLMAN.
METALLIC LINK CHAIN.
APPLICATION FILED DEC. 4, 1911.
1,103,026.
Patented July 14, 1914.
2 SHEETS—SHEET 1.
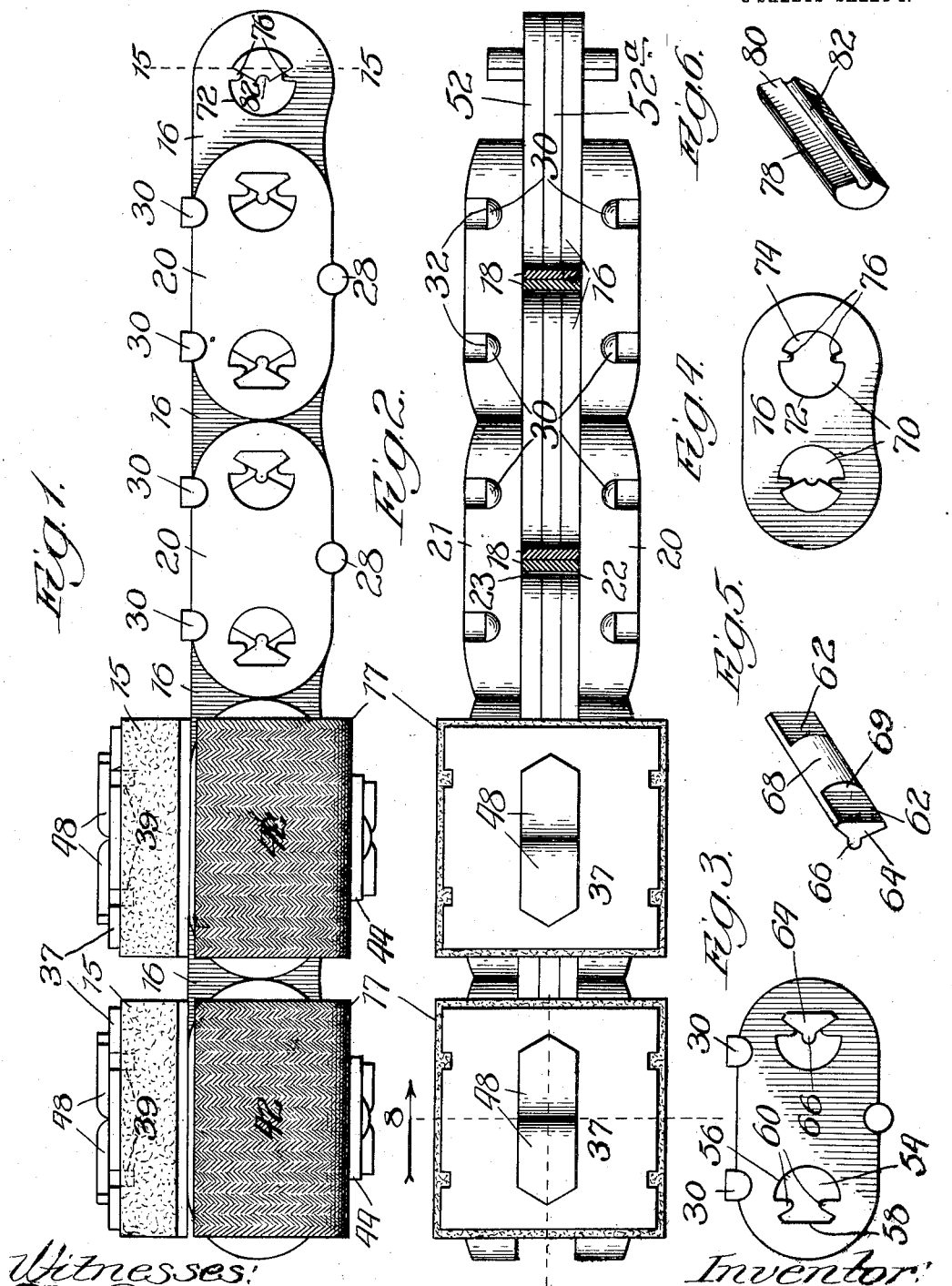

E. A. BOHLMAN.
METALLIC LINK CHAIN.
APPLICATION FILED DEC. 4, 1911.
1,103,026.
Patented July 14, 1914.
2 SHEETS—SHEET 2.
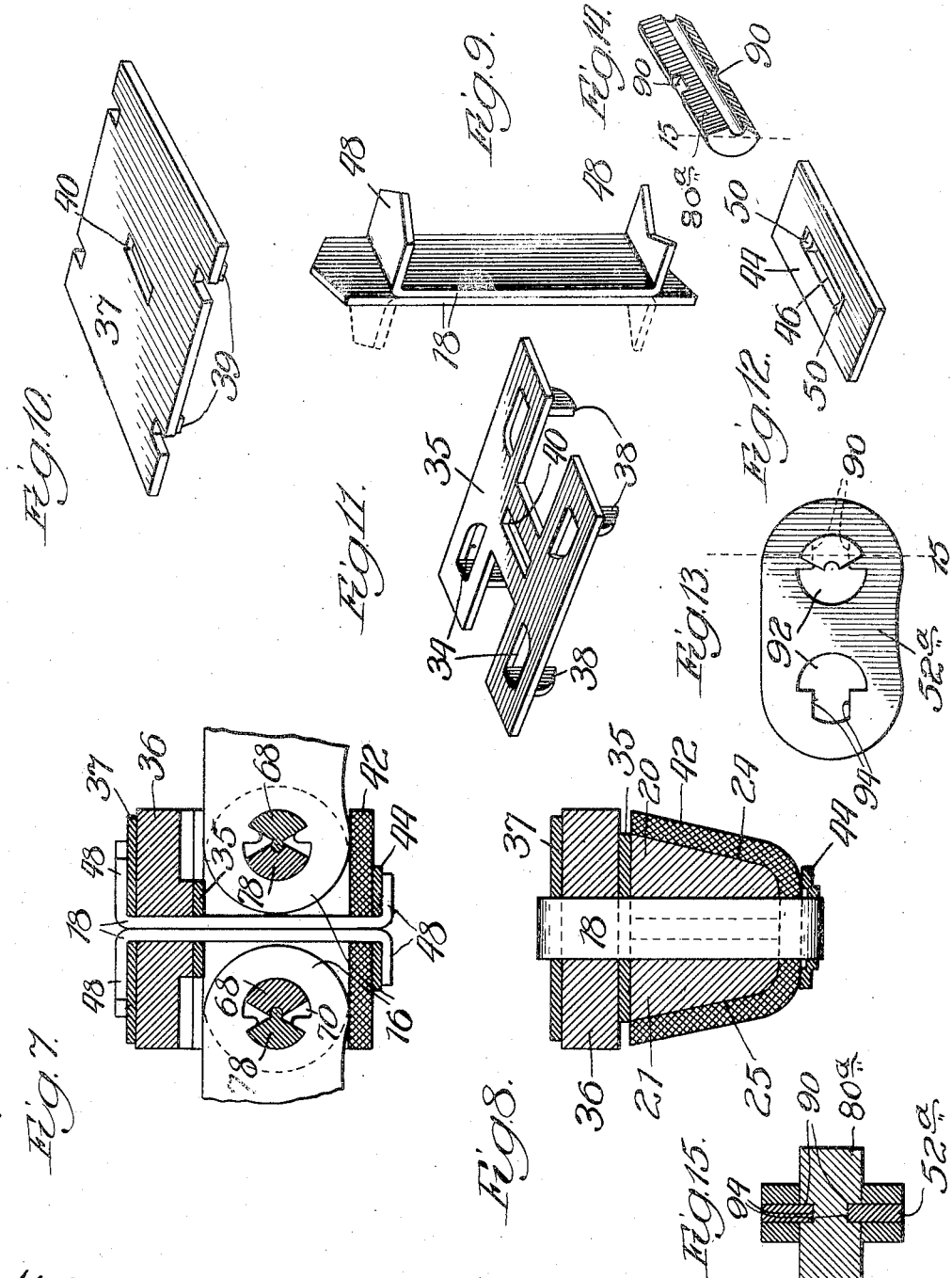
Witnesses:
C. E. Gaylord.
G. F. Chase.
Inventor:
Ernest A. Bohlman,
By Cheever & Cox
Attys.

UNITED STATES PATENT OFFICE.

ERNEST A. BOHLMAN, OF CEDAR RAPIDS, IOWA, ASSIGNOR TO PEERLESS V BELT COMPANY, OF CHICAGO, ILLINOIS, A CORPORATION OF ILLINOIS.

METALLIC LINK CHAIN.

1,103,026.  Specification of Letters Patent.  Patented July 14, 1914.

Application filed December 4, 1911. Serial No. 663,840.

*To all whom it may concern:*

Be it known that I, ERNEST A. BOHLMAN, a citizen of the United States, residing at Cedar Rapids, in the county of Linn and State of Iowa, have invented a certain new and useful Improvement in Metallic Link Chains, of which the following is a specification.

This invention relates to link chains of metal designed for use as transmission belts for power machinery. It is an improvement upon the device of this class set forth in United States Patent Number 979,151 to A. H. Gits, December 20, 1910, and in certain features an improvement upon Patent Number 875,426 for drive belt, issued December 21, 1907 to A. H. Gits.

The object of the invention is to do away with some bad features which exist in the devices of said prior patents.

More particularly the object of the invention is to provide a pivot device for the links thereof in which the bars forming the pivot are so mounted on the link members that they cannot readily tear loose from the link members and then wear into the link members, with consequent irregular lengthing of the chain.

The object of the invention is further to provide a novel form and quality of flexible material on the outside of the chain which will very readily grip the pulleys over which the chain passes.

The invention consists in a device capable of carrying out the foregoing objects which can be very easily and cheaply made, which is easily assembled and taken apart, which is satisfactory in operation, and not readily liable to get out of order.

Figure 1 is a side view, and Fig. 2 a plan, of a chain of this invention, the two left hand links of each figure being shown in full, the remaining two links being partially dismantled. Figs. 3, 4, 5 and 6 are details of different parts of the chain. Fig. 7 is a detail sectional view of one link taken on the line 7 of Fig. 2. Fig. 8 is a corresponding detail view taken on the line 8 of Fig. 2. Fig. 9 is a perspective detail view of the compound rivet for finally securing the parts of a complete link of the chain together. Figs. 10, 11 and 12 are details of the parts used in connection with the device of Fig. 9 in the manner which will hereafter clearly appear. Fig. 13 shows the middle plate of the secondary link 16 in a form of construction which may be used in this device. Fig. 14 is a perspective view of a modified form of the pin 80, for use in the construction of Fig. 13. Fig. 15 is a sectional detail view on the line 15—15, when the device of Figs. 13 and 14 is used.

As in both of said prior patents, the device, broadly speaking, consists in a plurality of primary links 15 connected together by secondary links 16 pivoted to the primary links, the primary links of this chain being inclosed upon the wearing side by a piece of friction material 17 secured thereto by rivets 18 passing vertically through the centers of the primary links. The chain of this invention, however, differs from those of the prior patents above referred to, in that the friction material is a specially treated canvas and does not run continuously the entire length of the chain; in the specially constructed rivets 18, and in the form and construction of the pivotal joints between the links.

The primary links 15 are constructed of two bars 20 and 21 having respectively vertical faces 22 and 23 adapted to lie close to the vertical walls of the secondary links 16 and having inclined outer faces 24 and 25 corresponding in angularity to the walls of the groove of the pulley in which the chain is to run. Depending from the lower portions of the bars 20 and 21 are lugs 28, and extending from the opposite upper faces of these bars are other projecting lugs 30 having opposite substantially parallel vertical faces 32.

Above each pair of connecting members 20 and 21 is placed a connecting plate of metal 35 having therein a plurality of perforations or openings 34 adapted to be entered by the lugs 30 and adapted to be engaged by the faces 32 thereof to thereby prevent spreading of the bars 20 and 21 away from each other. On the plate 35 is placed a block 36 of leather, fiber, press board, hard rubber or any other friction material, and over this block 36 is placed a projecting metal plate 37. The plate 35, heretofore referred to, is provided with a plurality of projecting prongs 38 which are driven into the under side of the block 36, and the plate 37 is provided with corresponding projections 39, which are driven into the upper surface of the block 36 so that when these two plates are supplied to the block 36, the block 36 therefore becomes, for practical purposes, a metal faced block. These plates are placed upon the block in substantial register with each other so that elongated slots 40 in the approximate center of each of the plates and in the center of the block 36 register with each other and thus make an elongated central opening through the metal covered block 36. This slot 40 heretofore referred to, is located in approximately the center of this metal covered block 36 and in such a position that when the block is placed upon the bars 20 and 21 of the primary link with the lugs 30 thereof entering the recess 34 in the plate 35, the slot 40 extends crosswise of the length of the primary link at its center and is directly over the opening which always exists in the center of the primary link between the ends of the secondary links. Around the lower or bearing portion of each primary link 15 of the chain is placed a piece of canvas 42 extending, as clearly appears in Fig. 8, up the sides of the primary link to approximately the lower edge of the plate 35. Below this canvas member 42 is a small metal plate or washer 44 having through its center a slot 46 in the same vertical plane as the slot 40 heretofore referred to.

Through the canvas 42 and the slots 40 and 46 are placed the compound rivets 18 comprising, as here shown, two parallel bars or strips of metal of approximately the same length having their ends 48 bent over at the top and bottom, as shown, to hold all of the parts of the primary link together.

In the prior devices, above referred to, ordinary rivets have been used in connection with chains of this class, but they are objectionable because the heads of the rivets being made by the pounding action of a hammer are liable to bend and interfere with the pivot of the primary link and it is impossible to spread the heads evenly and thus secure a uniform tension on all parts of the link which is to be secured together by this device, whereas, with the rivets 18, here used, the securing is obtained by bending the ends 48 from the full line position (on the left hand half of the rivet as shown in Fig. 9) to the dotted line position in that part of said figure, which bending can be done accurately, and when done will hold the parts with a uniform tension and considerable more anchoring surface. Aside from this, the rivet 18 is advantageous in that being flat it occupies less space between the ends of the secondary links 16 and thereby with a given strength of chain makes it possible to use shorter links, which is frequently advantageous.

In order to make the chain more satisfactorily grip the pulley over which it runs, than has been the case with prior devices above mentioned, the canvas friction strips 42 are treated, ordinarily before application to the chain, with a composition consisting of approximately seventy-six per cent. pitch, twenty-two and one-half per cent. asphaltum and one and one-half per cent. shellac.

In the plate 44 and immediately adjacent to the ends of the slot 46 are recesses 50 registering with the lugs 28 on the lower edges of the bars 20 and 21. These lugs 28 engage the canvas strip 42 immediately above these recesses 50, and when the parts of the rivet 18 are bent to the position of Fig. 7, press the canvas down, into these recesses 50, thereby securely gripping the canvas and preventing its shifting about the center of the primary link as would more easily be the case were these lugs and corresponding recesses omitted. The fact that the lugs 28 do thus enter the recesses 50, tends to securely hold the side bars 20 and 21 of the primary links against spreading. The secondary links 16 heretofore referred to, are all approximately, but not necessarily, the same length as the bars 20 and 21 of the primary links, and may be made of one piece of metal, but are preferably made of a plurality of thin sheets 52, as clearly appears in Fig. 2.

In the prior art, as illustrated in Patent Number 979,151 heretofore referred to, the primary and secondary links are pivoted together by means of members which have suitably curved surfaces in rolling contact with each other, the contacting members being supposedly secured to their respective primary or secondary links in a rigid manner, but the rolling action above referred to produces so much strain upon the securing devices there shown for fastening the pivot members to their respective primary and secondary links, that the pivot members break loose from said link parts, and, first do not work properly, thereby creating friction, and, finally, grind into the link parts proper, thereby materially injuring the efficiency of the device. In the construction of this invention, this difficulty is entirely obviated. This result is obtained by cutting in each end of the bars 20 and 21 an opening 54 of the shape illustrated in detail in the left hand end of Fig. 3, the opening being bounded by the curved face 56, the straight face 58 and the faces of two opposite inwardly projecting ridges 60, as shown. In the triangular space formed between the faces 58 and the adjacent faces of the ribs 60 is inserted the correspondingly shaped end 62 of a bearing pin 64 having the hardened rib 66 running lengthwise, as shown. The center portion of this pin 64 has a curved surface 68 on the opposite side from the rib 66 and between the end portions 62 heretofore described. The length of this curved surface 68 is substantially equal to or slightly greater than the thickness of the secondary link 16, while the length of the end portion 62 of the members 64 is substantially equal to or less than the thickness of the bars 20 and 21 of the primary link. When the pins 64 are in position with reference to the bars of the primary link, the inner walls of said links bear against the shoulders 69 formed at the ends of the surface 68 on member 64 as shown. Similarly each secondary link 16 has cut in its opposite ends holes 70 bounded respectively by the curved surfaces 72 and 74 and the walls of the inwardly projecting ribs 76. Driven into the space formed by the surface 74 and the adjacent faces of the ribs 76, is a pin 78 suitably shaped, as shown in Fig. 6, having a bearing face 80 provided with a recess 82 designed to register with the ridge 66 on pins 64. When the parts are in assembled position, both of the contacting surfaces being thoroughly hardened, all of the pivotal action between the adjacent primary and secondary links takes place along this ridge 66. As pin 78 is rigidly secured in its secondary link and as pin 64 is rigidly secured in its primary link in the manner heretofore described, it is impossible for these parts to get loose and transfer the pivotal action of the bearing to any other point.

In the assembling of the entire device, the secondary links 16 are provided with their pins 78 ordinarily secured in place so tightly that they are not easily removable. The operator now takes one of the bars of a primary link, places its pivotal pin 64 in place therein and inserts said pin 64 through the larger portion of the opening 70 in the adjacent secondary link with the ridge 66 in contact with the recess 82 and then places the other bar of the primary link in position over the second end of the pin 64. When both ends of the given primary links have been thus connected to a secondary link, he places a canvas friction member 42 about the lower portion of the primary link, places the plates 44 in contact therewith and inserts the compound members of the pin 18 therethrough between the parts of the primary link and the ends of the secondary and thereupon places the metal plated block in position, as shown, and bends the respective ends 48 of the securing pin 18 to the position of Fig. 7. This completes one link; the remaining links of the chains are made in the same way. If occasion arises for taking the chain apart, it is only necessary to bend the ends 48 of each half of the pin 18 until they are perpendicular with the block 36 and thus remove the pin and take the particular link in hand apart.

In the foregoing description, the pin 80 has been merely driven into the link 52 and held there by frictional contact. In practice, it is frequently preferable to secure this pin by mechanical means. In order to do this, a modified form of pin $80^a$ is provided having in its center notches 90 of substantially the width of the central member $52^a$ of the secondary links 16. The member $52^a$ of this link has cut in it holes 92, corresponding to the holes 70, heretofore described, but modified by the use of the rectangular shoulders 94 designed to receive the portion of the member $80^a$ which contains the notches 90, with the result that the metal of member $80^a$ adjacent to these shoulders 94 rigidly holds the member $80^a$ against endwise movement across the member $52^a$ with the result that when the parts are assembled into the complete secondary link 16, the two outside members 52 being placed on each side of member $52^a$ and on member $80^a$, as heretofore described, the member $80^a$ is mechanically rigidly held in the secondary link.

The claims are:

1. A link chain including a link member composed of three parallel plates, provided with a hole therethrough and a pivot pin inserted through said hole in the link, said pin being of less cross sectional area than said hole in the link and secured to said link member by engagement with non-circular portions of the edge of said hole, the configuration of the non-circular portion of the hole in the middle member of the link being different from the configuration of the openings in the outside members of the link and the middle portion of the pin being of corresponding different cross section for the purposes set forth.

2. A link chain including a link member made up of three plates provided with an opening therethrough, and a pivot pin inserted through said opening in said link, the opening through the middle plate of the link being of a different diameter from the openings in the outer plates, and said pin having a correspondingly different cross section at its central portion.

In witness whereof, I have hereunto subscribed my name in the presence of two witnesses.

ERNEST A. BOHLMAN.

Witnesses:
J. E. CAGNEY, Jr.,
ALLEN H. METCALF.